(12) United States Patent
Hayasaka

(10) Patent No.: US 9,916,495 B2
(45) Date of Patent: Mar. 13, 2018

(54) FACE COMPARISON DEVICE, METHOD, AND RECORDING MEDIUM

(71) Applicant: NEC Corporation, Minato-ku, Tokyo (JP)

(72) Inventor: Akihiro Hayasaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/127,489

(22) PCT Filed: Mar. 20, 2015

(86) PCT No.: PCT/JP2015/001566
§ 371 (c)(1),
(2) Date: Sep. 20, 2016

(87) PCT Pub. No.: WO2015/146101
PCT Pub. Date: Oct. 1, 2015

(65) Prior Publication Data
US 2017/0140211 A1 May 18, 2017

(30) Foreign Application Priority Data
Mar. 28, 2014 (JP) .................. 2014-067598

(51) Int. Cl.
*G06K 9/00* (2006.01)
*G06T 7/73* (2017.01)
(Continued)

(52) U.S. Cl.
CPC ..... *G06K 9/00281* (2013.01); *G06K 9/00208* (2013.01); *G06K 9/00288* (2013.01);
(Continued)

(58) Field of Classification Search
CPC .. G06K 9/00281; G06K 9/00208; G06K 9/52; G06K 9/00288; G06T 7/74;
(Continued)

(56) References Cited

U.S. PATENT DOCUMENTS 8,515,180 B2 8/2013 Kato et al.
2004/0125991 A1 7/2004 Yokoi
(Continued)

FOREIGN PATENT DOCUMENTS

JP 2004-213087 A 7/2004
JP 2008-123216 A 5/2008
(Continued)

OTHER PUBLICATIONS

Hiroyuki Takano, Takeo Kanade, Akito Yamasaki, and Koichiro Deguchi, "A method of face alignment for a variety of face orientations," Proceedings of the 15th Meeting on Image Recognition and Understanding (MIRU 2012), IS1-66, Aug. 6, 2012.
(Continued)

*Primary Examiner* — John Strege

(57) ABSTRACT

A face comparison device according to the present invention includes: an occluded-feature point estimation unit that estimates an occluded-feature point that is a feature point of an invisible face, and outputs position information of the occluded-feature point; a pseudo-feature point estimation unit that estimates a pseudo-feature point that is an erroneously detected feature point not captured within the input image due to occlusion, and outputs position information of the pseudo-feature point; and a comparison unit that generates a normalized image of the input image by using the position information of the occluded-feature point and the pseudo-feature point, generates a normalized image of an acquired comparison image, and compares the first facial feature vector extracted from the normalized image of the input image and the second facial feature vector extracted from the generated normalized image of the comparison image.

9 Claims, 13 Drawing Sheets

(51) Int. Cl.
  *G06T 7/593* (2017.01)
  *G06K 9/52* (2006.01)
  *G06T 19/20* (2011.01)
(52) U.S. Cl.
  CPC ............... *G06K 9/52* (2013.01); *G06T 7/593* (2017.01); *G06T 7/74* (2017.01); *G06T 19/20* (2013.01); *G06T 2200/04* (2013.01); *G06T 2219/2016* (2013.01)
(58) Field of Classification Search
  CPC . G06T 7/593; G06T 19/20; G06T 2219/2016; G06T 2200/04
  See application file for complete search history.

(56) References Cited

U.S. PATENT DOCUMENTS

| | | | | | |
|---|---|---|---|---|---|
| 2004/0264745 | A1* | 12/2004 | Gu | ............... | G06K 9/00281 382/118 |
| 2008/0130961 | A1* | 6/2008 | Kinoshita | .......... | G06K 9/00281 382/118 |
| 2010/0246905 | A1* | 9/2010 | Yuasa | ............... | G06K 9/00261 382/118 |
| 2011/0158542 | A1 | 6/2011 | Kato et al. | | |
| 2011/0254942 | A1* | 10/2011 | Suzuki | ............... | G06K 9/00221 348/77 |
| 2013/0243274 | A1* | 9/2013 | Sukegawa | .......... | G06K 9/00221 382/118 |
| 2015/0078631 | A1* | 3/2015 | Belhumeur | ........ | G06K 9/00281 382/118 |

FOREIGN PATENT DOCUMENTS

| | | |
|---|---|---|
| JP | 4653606 B2 | 3/2011 |
| JP | 2011-138388 A | 7/2011 |
| JP | 2011-209116 A | 10/2011 |

OTHER PUBLICATIONS

International Search Report for PCT Application No. PCT/JP2015/001566, dated Jun. 9, 2015.
English translation of Written opinion for PCT Application No. PCT/JP2015/001566.

* cited by examiner

Fig. 7

```
┌─────────────────────────────────┐
│ THREE-DIMENSIONAL STEREOSCOPIC  │
│ FACE MODEL AND FEATURE POINTS ON│
│           THE MODEL             │
│       ANGLE INFORMATION         │
└─────────────────────────────────┘
                │
                ▼
┌─────────────────────────────────┐
│   ESTIMATE OCCLUDED-FEATURE     │── S21
│            POINT                │
└─────────────────────────────────┘
                │
                ▼
┌─────────────────────────────────┐
│  ESTIMATE PSEUDO-FEATURE POINT  │── S22
└─────────────────────────────────┘
                │
                ▼
┌─────────────────────────────────┐
│     CALCULATE CORRECTION        │── S23
│           QUANTITY              │
└─────────────────────────────────┘
                │
                ▼
┌─────────────────────────────────┐
│     CORRECT FEATURE POINT       │── S24
└─────────────────────────────────┘
                │
                ▼
┌─────────────────────────────────┐
│         NORMALIZATION           │── S25
└─────────────────────────────────┘
                │
                ▼
┌─────────────────────────────────┐
│          COMPARISON             │── S26
└─────────────────────────────────┘
                │
                ▼
         COMPARISON
           RESULT
```

FACE COMPARISON DEVICE, METHOD, AND RECORDING MEDIUM

This application is a National Stage Entry of PCT/JP2015/001566 filed on Mar. 20, 2015, which claims priority from Japanese Patent Application 2014-067598 filed on Mar. 28, 2014, the contents of all of which are incorporated herein by reference, in their entirety.

TECHNICAL FIELD

The present invention relates to a face recognition technique, in particular, relating to a face recognition technique that compares faces by using face information in input images.

BACKGROUND ART

The face recognition technique is a technique of authenticating a person by extracting a plurality of feature points from a face image of the person, digitizing the features, and matching the digitized feature points with other image. The face recognition device is capable of recognizing a somewhat disguised face or a face in a photograph of some decades ago based on a plurality of extracted feature points. As such, face recognition devices have been widely utilized in a field such as personal identification.

However, the face of a person sometimes shows a different look in a face image or a portion of the face may be hidden due to factors, such as the angle, posture, brightness, position, and size of the face. It is difficult to extract feature points of the invisible portion of a face. For such reasons, the face recognition technique embodies a problem in which recognition of a face image cannot be accurately performed.

To address this problem, recently, a three-dimensional face recognition technique for achieving accurate recognition of a face in consideration of the invisible portion of the face has been proposed. This technique acquires stereoscopic information of a face using three-dimension sensors. Then, this technique can extract significant feature points of the contour of the eye orbit, nose, chin, or the like from the stereoscopic information, generate a face image of a different angle than the input face image, and compare the face image with other face image.

For example, the image recognition device disclosed in PLT 1 generates a three-dimensional face model by using feature point information of a face detected from an input image and three-dimensional shape information of a face that is registered in advance. Next, the image recognition device of PLT 1 calculates a geometric transformation parameter by using the generated three-dimensional face model. Based on this parameter, the image recognition device of PLT 1 generates a plurality of face pattern images (two-dimensional face images) of different postures and extracts facial feature vectors from the generated face pattern images. Then, the image recognition device of PLT 1 calculates a similarity between the facial feature vectors of registered images that is registered in advance and the feature vectors of the generated face pattern images, and recognizes the face image. By using the method as above, the image recognition device of PLT 1 can align (normalize) the position, size or the like of a face in a face image to reference data.

However, the method of PLT 1 sometimes cannot accurately detect the feature points of a face detected from an input image due to the angle, posture, or brightness of the face. In particular, due to a change of the posture of a face (for example, due to a hidden portion (self-occlusion) that happens on the side or contour of the nose), the method of PLT 1 possibly erroneously detects the feature point information of the accurate position of the nose.

FIG. 13 is a diagram illustrating an example of erroneously detecting likely positions as feature points in an image when the feature points that are supposed to exist are hidden due to occlusion, by taking an example of face contour points.

As illustrated in FIG. 13, the face contour points (black dots) detected in a frontal face image 100 and the face contour points detected in an oblique right face image 200 are located at different positions in the strict sense. As illustrated in the face image 300, the originally existing positions of the face contour points in the frontal face image 100, when the face is three-dimensionally rotated, are located inner side of the face than the face contour points detected in the oblique right face image 200. Thus, the face contour points detected in the oblique right face image 200 are not accurate feature points.

As such, a correct facial feature vector cannot be extracted from a face pattern image that is generated by calculating a geometric transformation parameter by using such information as detected from the oblique right face image 200. Thus, the technique of PLT 1 has the above-mentioned problem.

Two approaches can be considered to solve the technical problem described in PLT 1. The first approach is an approach of estimating a geometric transformation parameter without using feature points that could not be detected at accurate positions.

The first approach, for example, can be realized by using a robust estimation method represented by Random Sample Consensus (RANSAC). In the first approach, the visible portion of the face can be accurately normalized. However, the image of the area hidden in the deep side of the screen is destructed due to normalization.

Concretely, a phenomenon (loss), in which the area where the texture of a face is supposed to exist is mixed with the background texture, occurs. As such, the first approach has the above problem.

The second approach is an approach of correcting the feature points that could not be detected at accurate positions to the accurate positions.

The method of correcting feature points in the second approach includes, for example, a method disclosed in PLT 2. The method of PLT 2 generates variations of feature point positions in partial spaces (for example, three patterns of front, right, and left orientations) in advance, and obtains corrected feature point positions based on projection or back projection in the partial spaces.

Further, NPL 1 discloses a technique of maintaining, in advance, correction quantities when a standard stereoscopic face model is rotated for respective angles in a table and selecting an appropriate correction quantity from the table based on the angle of a face in a two-dimensional image.

It should be noted that PLT 3 describes a method that is used in the Description of Embodiments.

CITATION LIST

Patent Literature

[PLT 1] Publication of Japanese Patent No. 4653606
[PLT 2] Japanese Unexamined Patent Application Publication No. 2011-138388
[PLT 3] Japanese Unexamined Patent Application Publication No. 2011-209116

Non Patent Literature

[NPL 1] Hiroyuki Takano, Takeo Kanade, Akito Yamasaki, and Koichiro Deguchi, "A method of face alignment for a variety of face orientations," Proceedings of the 15th Meeting on Image Recognition and Understanding (MIRU 2012), IS1-66, Aug. 6, 2012

SUMMARY OF INVENTION

Technical Problem

However, the method described in PLT 2 requires learning data for generating partial spaces. In addition, the method described in PLT 2 needs to generate a partial space for every variation pattern. Thus, the method described in PLT 2 has a problem in which a large amount of learning data is needed to correct feature points for each fine angle and generation of a large number of partial spaces is required.

Further, the technique described in NPL 1 requires generation of a table that indicates a relationship between an angle of a face and a correction quantity of a feature point in advance. Further, the technique described in NPL 1 requires generation of a visibility table for each angle for hidden feature points as the subjects of correction, in advance. Further, the technique described in NPL 1 requires manual input of measures and initial values for angles in a vertical direction (pitch angle). As such, the technique described in NPL 1 has a problem in which tables and initial values are required to be generated in advance.

The objective of the present invention is to provide a face comparison device, method and recording medium that realizes highly precise authentication in consideration of the above problem.

Solution to Problem

For achieving the above-mentioned objection, one aspect of a face comparison device includes: an occluded-feature point estimation unit that estimates an occluded-feature point that is a feature point of an invisible face in an input image based on an angle of the face in the input image, a three-dimensional stereoscopic face model, and a model feature point arranged on the three-dimensional stereoscopic model, and outputs position information of the occluded-feature point; a pseudo-feature point estimation unit that estimates a pseudo-feature point that is an erroneously detected feature point that is a feature point of the face not captured within the input image due to occlusion based on the angle of the face in the input image by using position information of the three-dimensional stereoscopic face model that is rotated, and outputs position information of the pseudo-feature point; and a comparison unit that generates a normalized image of the input image by using the position information of the occluded-feature point and the position information of the pseudo-feature point, extracts a first facial feature vector from the generated normalized image of the input image, generates a normalized image of an acquired comparison image, extracts a second facial feature vector from the generated normalized image of the comparison image, and compares the first facial feature vector and the second facial feature vector.

Alternatively, one aspect of a face comparison method according to the present invention includes: estimating an occluded-feature point that is a feature point of an invisible face in an input image based on an angle of the face in the input image, a three-dimensional stereoscopic face model, and a model feature point arranged on the three-dimensional stereoscopic face model, and outputting position information of the occluded-feature point; estimating a pseudo-feature point that is an erroneously detected feature point that is a feature point of the face not captured within the input image due to occlusion based on the angle of the face in the input image by using position information of the three-dimensional stereoscopic face model that is rotated, and outputting position information of the pseudo-feature point; and generating a normalized image of the input image by using the position information of the occluded-feature point and the position information of the pseudo-feature point, extracting a first facial feature vector from the generated normalized image of the input image, generating a normalized image of an acquired comparison image, extracting a second facial feature vector from the generated normalized image of the comparison image, and comparing the first facial feature vector and the second facial feature vector.

Furthermore, one aspect of a computer readable non-transitory recording medium embodying a program, the program causing a computer to perform a method, the method includes: estimating an occluded-feature point that is a feature point of an invisible face in an input image based on an angle of the face in the input image, a three-dimensional stereoscopic face model, and a model feature point arranged on the three-dimensional stereoscopic face model, and outputting position information of the occluded-feature point; estimating a pseudo-feature point that is an erroneously detected feature point that is a feature point of the face not captured within the input image due to occlusion based on the angle of the face in the input image by using position information of the three-dimensional stereoscopic face model that is rotated, and outputting position information of the pseudo-feature point; and generating a normalized image of the input image by using the position information of the occluded-feature point and the position information of the pseudo-feature point, extracting a first facial feature vector from the generated normalized image of the input image, generating a normalized image of an acquired comparison image, extracting a second facial feature vector from the generated normalized image of the comparison image, and comparing the first facial feature vector and the second facial feature vector.

Advantageous Effects of Invention

According to the present invention, the invention can provide an effect of realizing highly precise authentication.

BRIEF DESCRIPTION OF DRAWINGS

FIG. 7 is a flowchart illustrating an example of an operation of the face comparison device according to the second exemplary embodiment.

DESCRIPTION OF EMBODIMENTS

The following will describe a face comparison device according to exemplary embodiments of the present invention in detail with reference to the drawings.

(First Exemplary Embodiment)

Next, a first exemplary embodiment of the present invention will be described in detail with reference to the drawings.

Figure 1:
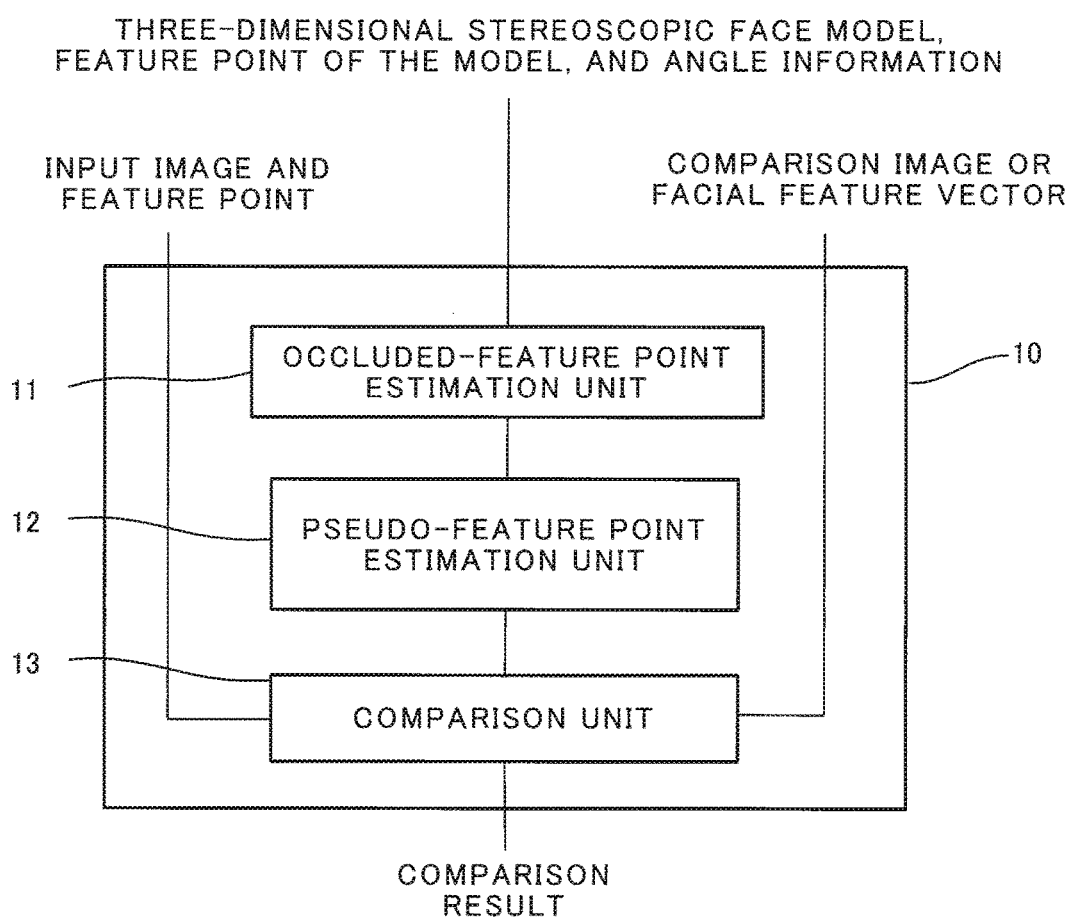
FIG. 1 is a block diagram illustrating an example of a configuration of a face comparison device according to a first exemplary embodiment of the present invention.

FIG. 1 is a block diagram illustrating an example of a configuration of a face comparison device 10 according to the first exemplary embodiment of the present invention.

As illustrated in FIG. 1, the face comparison device 10 according to the first exemplary embodiment includes an occluded-feature point estimation unit 11, a pseudo-feature point estimation unit 12, and a comparison unit 13.

Next, the components of the face comparison device 10 illustrated in FIG. 1 will be described.

The occluded-feature point estimation unit 11 rotates a three-dimensional stereoscopic face model and a model feature point on the model based on angle information representing the orientation of a face in a two-dimensional image other than a frontal face image (hereinafter, referred to as the "input image").

Then, the occluded-feature point estimation unit 11 estimates the model feature point, which corresponds to the feature point of the face that is not captured in the input image, on the three-dimensional stereoscopic face model by using the rotated three-dimensional stereoscopic face model and the position information of the model feature point on the model. That is, the occluded-feature point estimation unit 11 estimates the supposed position of the feature point of the face, which is not captured in the input image and hidden due to occlusion, in the input image. Then, the occluded-feature point estimation unit 11 outputs the position information.

The position of model feature point, which corresponds to the feature point of the face on the three-dimensional stereoscopic face model and is not captured in the input image, is a position which is same position or approximate position where occluded-feature point, as will be described later, is supposedly located in the input image.

Here, the feature point is a point relating to the portion of a face, for example, nostril, corner of the mouth, eye tail, or the like. Further, the position information of the feature point is coordinate values of the portion of a face. It should be noted that the position information of the feature point may be other data, as long as the data allows estimation of position.

Then, for example, a contour point or a point on the side of the nose in the frontal face when an image is captured with the frontal face oriented on the side, a feature point of the chin in the face when an image is captured with the face down, or the like is rotated toward the deep side of the input image. As such, the above feature point is hidden due to occlusion and becomes invisible in the input image. In the first exemplary embodiment, instead of such occluded-feature point, a point defined using the model feature point where the feature point is supposed to be located is estimated on the three-dimensional stereoscopic face model. Hereinafter, such occluded-feature point is referred to as the "occluded-feature point."

The pseudo-feature point estimation unit 12 estimates the feature point that is erroneously detected as the feature point of the face that is not captured within the input image due to occlusion by using the position information of the rotated three-dimensional stereoscopic face model based on the angle information of the face in the input image. Hereinafter, the feature point that is erroneously detected is referred to as the "pseudo-feature point."

For example, a contour point or a point on the side of the nose in the frontal face when an image is captured with the frontal face oriented on the side, or a feature point of the chin in the face when an image is captured with the face down, or the like is rotated toward the deep side of the input image. As such, the feature point of the face that is supposed to be invisible in the input image due to occlusion is detected as feature point of the face at position different from the supposedly existing position in the input image. The erroneously detected feature point is the pseudo-feature point.

When the comparison unit 13 receives the position information of the occluded-feature point estimated by the occluded-feature point estimation unit 11 and the position information of the pseudo-feature point estimated by the pseudo-feature point estimation unit 12, the comparison unit 13 acquires the input image and the feature point of the face in the input image.

Then, the comparison unit 13 calculates a correction quantity for correcting the feature point of the face in the input image based on the position information of the occluded-feature point and the pseudo-feature point, and information such as the scale of the face in the input image and the scale of the three-dimensional stereoscopic face model. Then, the comparison unit 13 corrects the feature point of the face in the input image by using the calculated correction quantity.

Next, the comparison unit 13 estimates a geometric transformation parameter by using the corrected feature point of the face in the input image, the three-dimensional stereoscopic face model, and the model feature point arranged on the model. Then, the comparison unit 13 generates a normalized face image of the input image by using the estimated geometric transformation parameter. Then, the comparison unit 13 extracts a facial feature vector based on the generated normalized face image.

Then, the comparison unit 13 acquires a two-dimensional image of a frontal face for comparison (hereinafter, referred to as the "comparison image"). The comparison unit 13 normalizes the acquired comparison image and generates a normalized face image of the comparison image. Next, the comparison unit 13 extracts a facial feature vector based on the normalized image of the comparison image.

Then, the comparison unit 13 compares the facial feature vector extracted based on the normalized image of the comparison image and the facial feature vector extracted based on the normalized face image of the input image. Then, the comparison unit 13 outputs the comparison result.

The following will describe the operation of the face comparison device according to the first exemplary embodiment of the present invention with reference to the drawings.

Figure 2:
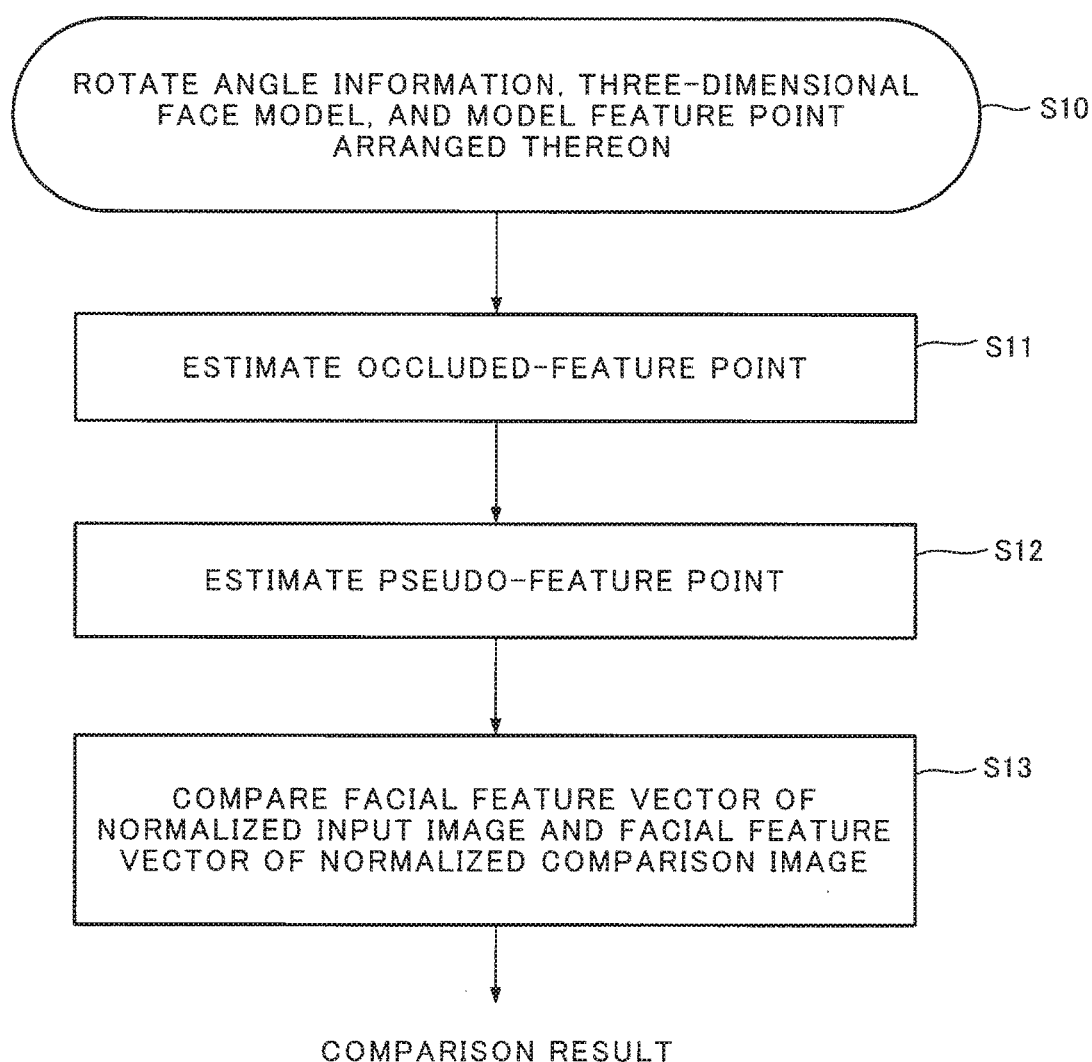
FIG. 2 is a flowchart illustrating an example of an operation of the face comparison device according to the first exemplary embodiment.

FIG. 2 is a flowchart illustrating an example of the operation of the face comparison device according to the first exemplary embodiment of the present invention.

First, the occluded-feature point estimation unit 11 acquires the angle information of a face in the input image, and the three-dimensional stereoscopic face model and the model feature point existing on the model. Then, the occluded-feature point estimation unit 11 rotates the three-dimensional stereoscopic face model and the model feature point existing on the model by the same angle as the angle information of the face in the input image (step S10).

For example, when the angle information of the face in the input image indicates that the face is rotated to the right by θ degree (0<θ<90 degrees), the occluded-feature point estimation unit 11 rotates the three-dimensional stereoscopic face model M and the model feature point $P_m$ to the right by θ degree.

The angle information of the face in the input image, and the three-dimensional stereoscopic face model and the model feature point existing on the model may be input from a device outside the face comparison device 10. Alternatively, the face comparison device 10 includes a storage unit, which is not illustrated. Then, the face comparison device 10 stores the angle information of the face of the input image, and the three-dimensional stereoscopic face model and the model feature point existing on the model in the storage unit in advance. Then, the occluded-feature point estimation unit 11 may acquire the above information from the storage unit and use it.

Further, the three-dimensional stereoscopic face model used by the face comparison device 10 is not particularly restricted as long as the stereoscopic model can three-dimensionally represent the face. For example, the three-dimensional stereoscopic face model may be a three-dimensional stereoscopic model of a person captured in an image. Alternatively, the three-dimensional stereoscopic face model may be a three-dimensional stereoscopic model based on an average face.

The face comparison device 10 only has to acquire the angle information of the face in the input image in advance by using a general method. For example, the face comparison device 10 may use the method described in PLT 3 (Japanese Unexamined Patent Application Publication No. 2011-209116). However, this method is only an example. The face comparison device 10 may also use other method, as long as the method can acquire the angle information of a face in an input image.

Figure 3:
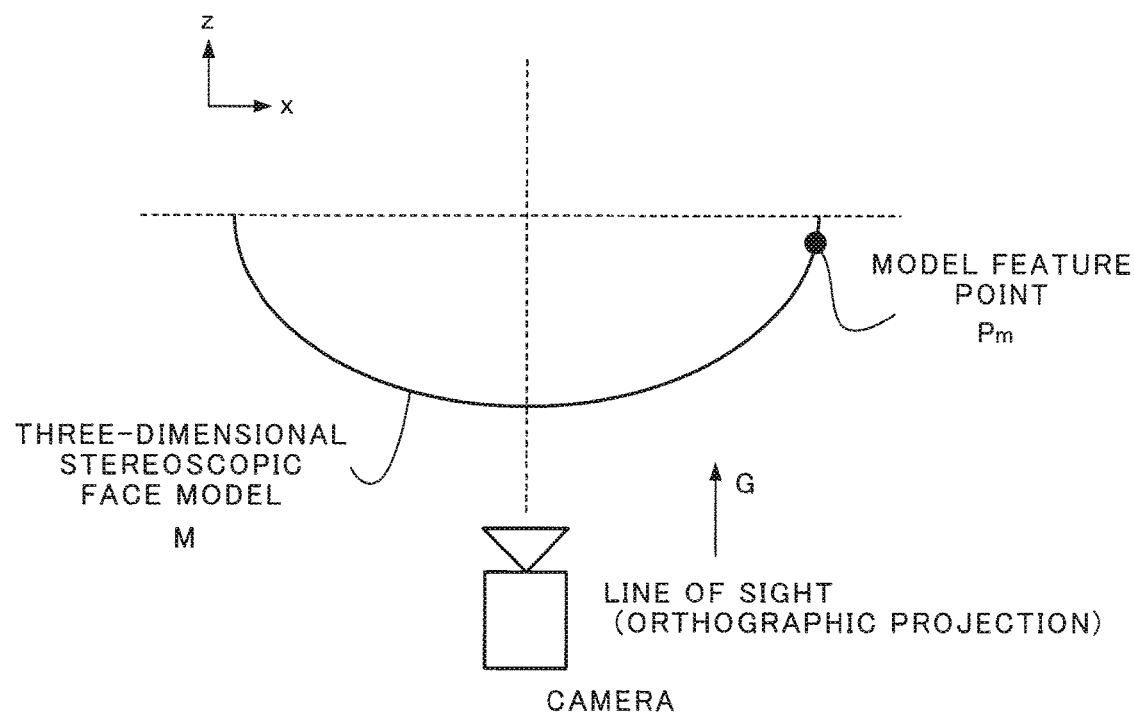
FIG. 3 is a diagram illustrating an example of a conceptual image of a three-dimensional stereoscopic model of the face comparison device according to the first exemplary embodiment in a three-dimensional space with viewed from right above.

FIG. 3 is a diagram of an example of a conceptual image of a three-dimensional stereoscopic model (M) of the face comparison device 10 according to the first exemplary embodiment in a three-dimensional space with viewed from right above.

In FIG. 3, the arc-shaped solid line illustrates a three-dimensional stereoscopic face model M when the model is viewed from right above. The arc-shaped solid line illustrated in FIG. 3 illustrates a conceptual image when the frontal face is viewed from right above. The black dot on the arc-shaped solid line is a model feature point $P_m$ that indicates a feature point on the contour of the three-dimensional stereoscopic face model M. The model feature point $P_m$ illustrated in FIG. 3 is a feature point of the face. The camera illustrated in the lower portion of FIG. 3 is a device that generates an input image. In FIG. 3, the camera is assumed as being located at the front of the three-dimensional stereoscopic face model M (the position of depth Z=0). Further, the camera is a reference of the direction of the line of sight G.

Further, in FIG. 3, X (parallel direction) and Z (depth) indicate coordinate axes in the three-dimensional space as illustrated by using dashed lines. Since FIG. 3 is a state viewed from right above, a Y (vertical direction) axis is not illustrated in FIG. 3.

Figure 4:
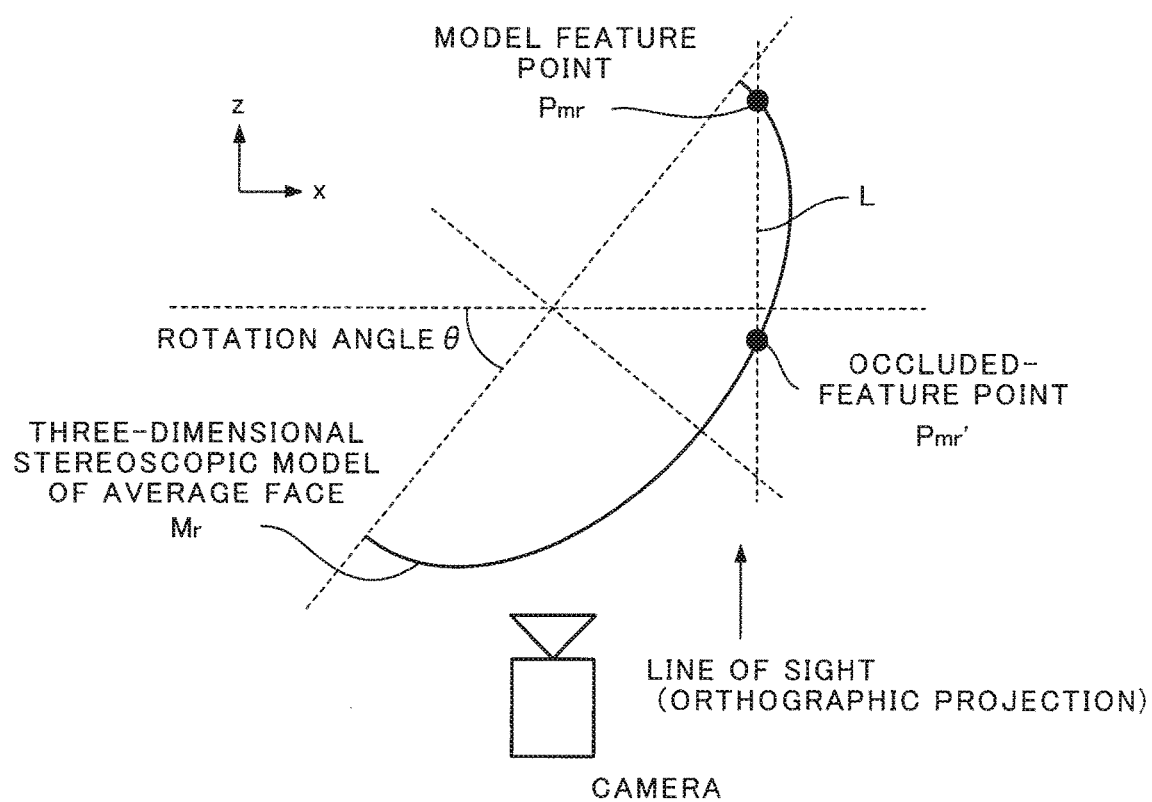
FIG. 4 is a diagram illustrating an example of a conceptual image of a three-dimensional stereoscopic model the face comparison device according to the first exemplary embodiment of the present invention in a three-dimensional space with rotated by a predetermined rotation angle.

FIG. 4 is a diagram illustrating an example of a conceptual image of a three-dimensional stereoscopic model M of the face comparison device according to the first exemplary embodiment of the present invention in a three-dimensional space with rotated by a rotation angle θ.

As illustrated in FIG. 4, the occluded-feature point estimation unit 11 rotates the three-dimensional stereoscopic face shape model and the feature point on the model (model feature point $P_m$) by using the angle information (rotation angle θ) of the face in the input image (step S10).

In the case of FIG. 4, the rotated three-dimensional stereoscopic face model in the input image corresponds to the three-dimensional stereoscopic face model $M_r$. Further, the rotated feature point of the face in the input image corresponds to the model feature point $P_{mr}$.

Here, it is supposed that the line of sight L that passes through the rotated model feature point $P_{mr}$ intersects with the rotated three-dimensional stereoscopic face model $M_r$ at an intersection point $P_{mr}'$ that is a position closer to the camera than the model feature point $P_{mr}$. In such a case, the occluded-feature point estimation unit 11 estimates the intersection point $P_{mr}'$ as the occluded-feature point $P_{mr}'$. Then, the occluded-feature point estimation unit 11 outputs the position information of the estimated occluded-feature point $P_{mr}'$ (step S11).

It should be noted that the rotated three-dimensional stereoscopic model can be orthographically projected in the depth direction (Z direction). In a case of orthographical projection of the three-dimensional stereoscopic model in the depth direction, the occluded-feature point estimation unit 11 uses the intersection point $P_{mr}'$ where a straight line (line of sight) L that is parallel to the depth direction (Z direction) including the rotated model feature point $P_{mr}$ intersects with the rotated three-dimensional stereoscopic face model $M_r$. That is, when the intersection point $P_{mr}'$ is at a position closer to the camera than the rotated model feature point $P_{mr}$, the occluded-feature point estimation unit 11 may estimate the intersection point $P_{mr}'$ as the occluded-feature point $P_{mr}'$.

Next, the pseudo-feature point estimation unit 12 estimates a point where the occluded-feature point $P_{mr}'$ is assumed to be detected (pseudo-feature point) in the input image (step S12).

In other words, the pseudo-feature point estimation unit 12 estimates the feature point that is erroneously detected as a feature point of the face (pseudo-feature point) and is not captured within the input image due to occlusion by using the position information of the rotated three-dimensional stereoscopic face model based on the angle information of the face in the input image. Then, the pseudo-feature point estimation unit 12 outputs the position information of the pseudo-feature point.

The pseudo-feature point is, as described above, a feature point of a face that is supposed to be invisible in the input image due to occlusion and is erroneously detected as a feature point of the face in the input image. The pseudo-feature point is, for example, a contour point or a point on the side of the nose in the frontal face when an image is captured with the frontal face oriented on the side, or a feature point of the chin in the face when an image is captured with the face down, or the like.

Figure 5:
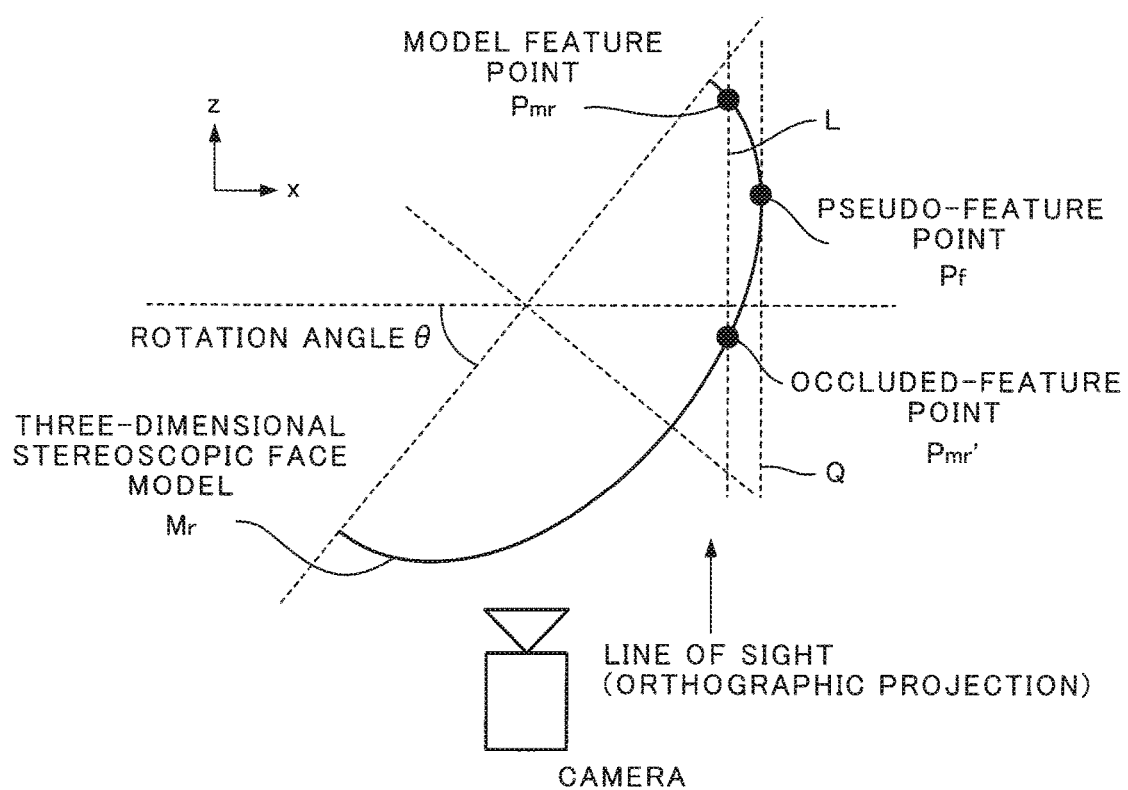
FIG. 5 is a diagram illustrating an example of a conceptual image of a three-dimensional stereoscopic model of a face comparison device according to a second exemplary embodiment in a three-dimensional space with rotated by rotation angle θ.

As illustrated in FIG. 5, the rotated three-dimensional stereoscopic model is assumed to be orthographically projected in the depth direction (Z direction). The pseudo-feature point estimation unit 12 orthographically projects the rotated three-dimensional stereoscopic model $M_r$ in the depth direction (Z direction). Based on this orthographic projection, the pseudo-feature point estimation unit 12 estimates, as a pseudo-feature point $P_f$, a contact point $P_f$ obtained by moving the line of sight L so as to contact with the three-dimensional stereoscopic model $M_r$ in the outside of the face outer than the model feature point $P_{mr}$. Then, the pseudo-feature point estimation unit 12 outputs the position information of the pseudo-feature point $P_f$.

Further, for example, when assuming a face contour point, the face contour point is considered to be detected on a boundary line Q of the face and the background. Thus, when the three-dimensional stereoscopic face model $M_r$ rotated in line with the angle of the face in the input image is viewed from a viewpoint (camera), the pseudo-feature point estimation unit 12 may estimate, as a pseudo-feature point $P_f$, a point $P_f$ located on the boundary line Q of the three-dimensional stereoscopic face model $M_r$ and the background. Then, the pseudo-feature point estimation unit 12 may output the position information of the estimated pseudo-feature point $P_f$.

When a boundary point between the three-dimensional stereoscopic model and the background is estimated as a pseudo-feature point, the pseudo-feature point estimation unit 12 estimates a point $P_f$ that is located at the outermost of the face and closer to the camera than the model feature point $P_{mr}$ (where Z is small) as a pseudo-feature point $P_f$. Then, the pseudo-feature point estimation unit 12 outputs the position information of the estimated pseudo-feature point $P_f$.

Next, the comparison unit 13 extracts a facial feature vector of the normalized image of the input image and a facial feature vector of the normalized image of the comparison image. Then, the comparison unit 13 compares the extracted two facial feature vectors. Then, the comparison unit 13 outputs the comparison result (step S13).

That is, when receiving the position information of the occluded-feature point $P_{mr}'$ and the pseudo-feature point $P_f$, the comparison unit 13 acquires the input image and the feature point of the face in the input image. Here, the acquisition method of the comparison unit 13 is not particularly restricted. For example, the comparison unit 13 may acquire the input image and the feature point of the face of the input image from an external device, which is not illustrated. Alternatively, the face comparison device 10 includes a storage unit, which is not illustrated. Then, the face comparison device 10 stores the input image and the feature point of the face in the input image in the storage unit in advance. Then, the comparison unit 13 may acquire the above information from the storage unit.

Next, the comparison unit 13 calculates a correction quantity for correcting the feature point of the face in the input image based on the position information of the occluded-feature point $P_{mr}'$ and the pseudo-feature point $P_f$, and, scale information of the face in the acquired input image and the three-dimensional stereoscopic face model. Then, the comparison unit 13 corrects the feature point of the face in the input image.

The acquired correction quantity is a correction quantity for correcting the feature point of the face in the input image to the supposedly located feature point with the correction quantity for correcting the pseudo-feature point $P_f$ to the occluded-feature point $P_{mr}'$ as reference, as illustrated in FIG. 5.

That is, the comparison unit 13 calculates a difference of scales between the three-dimensional stereoscopic face model M and the face in the input image based on the comparison between the face of the acquired input image and the three-dimensional stereoscopic face model M. Subsequently, the comparison unit 13 uses, as a correction quantity, a value obtained by multiplying a difference of position information between the occluded-feature point $P_{mr}'$ on the rotated three-dimensional stereoscopic model $M_r$ and the pseudo-feature point $P_f$ by the scale difference.

In the first exemplary embodiment, there is no Z axis in the input image. Thus, the acquired correction quantity is a correction quantity of displacement between the pseudo-feature point $P_f$ and the occluded-feature point $P_{mr}'$ where the model feature point $P_{mr}$ is supposed to be located in the input image in X coordinate. As such, the comparison unit 13 calculates a correction quantity for correcting the position of the occluded-feature point $P_{mr}'$ based on the displacement between the occluded-feature point $P_{mr}'$ and the pseudo-feature point $P_f$ on an X axis.

Concretely, the comparison unit 13 may use, as a correction quantity, a scale factor (the quantity of scaling) according to the difference of scales between the three-dimensional stereoscopic face model $M_r$ and the face in the input image based on the difference value of the two points of the occluded-feature point $P_{mr}'$ and the pseudo-feature point $P_f$ in X coordinate.

Correction with regard to an X direction has been described so far, the comparison unit 13 can similarly calculate a correction quantity in a Y direction by using the series of processing from steps S10 to S12.

The comparison unit 13 corrects the feature point of the face in the input image based on the calculated correction quantity.

Next, the comparison unit 13 estimates a geometric transformation parameter by using the feature point of the face in the input image including the corrected feature point, and the three-dimensional stereoscopic face model and the model feature point $P_{mr}$ arranged on the model. Then, the comparison unit 13 generates the normalized face image of the input image by using the estimated geometric transformation parameter.

Concretely, the comparison unit 13, first, estimates a perspective projection transformation parameter between the corrected feature point of the face in the input image "$P_i=(u,v)$" and the model feature point "$P_m=(X,Y,Z)$." $P_i$ refers to the corrected feature point of the face in a two-dimensional image. Further, u refers to a horizontal axis in the two-dimensional coordinate and v refers to a vertical axis in the two-dimensional coordinate. The comparison unit 13 may estimate a perspective projection transformation parameter by using a nonlinear optimization method or a linear least-squares method by linear approximation.

Then, the comparison unit 13 calculates a position where the three-dimensional stereoscopic face model is projected on a two-dimensional image by using the estimated perspective projection transformation parameter.

The comparison unit 13 can attach color information of the two-dimensional image to the three-dimensional stereoscopic face model based on the above calculation result. Then, the comparison unit 13 generates a two-dimensional face image, in which the angle or size of the face is normalized, based on the three-dimensional stereoscopic face model including the attached color information.

Next, the comparison unit 13 extracts a facial feature vector of the normalized input image. The comparison unit 13 may use a general Gabor feature, LBP (Local Binary Pattern), or the like for extracting the feature vector. The method used by the comparison unit 13 is not particularly restricted, as long as the method can extract a feature vector.

Then, the comparison unit 13 acquires a comparison image, applies the same processing to the acquired comparison image, and extracts a feature vector of the comparison image. The comparison unit 13 compares the facial feature vector in the extracted normalized image and the facial feature vector in the input image. Then, the comparison unit 13 outputs the comparison result.

In the first exemplary embodiment, the input image and comparison image may be acquired from an external device, which is not illustrated. Alternatively, the first exemplary embodiment may include a storage unit, not illustrated, in the face comparison device 10. In such a case, in the first exemplary embodiment, the storage unit may store the input image and the comparison image, or the facial feature vector of the normalized image obtained by applying normalization processing to the comparison image. Then, the comparison unit 13 may acquire information, such as the above image or feature vector, from the storage unit to use.

When the above-mentioned operation is completed, the face comparison device 10 according to the first exemplary embodiment ends the operation.

The first exemplary embodiment of the present invention has an effect of not requiring generation of a table relating to the angle of a face and a correction quantity in advance. This is because the occluded-feature point estimation unit 11 estimates the position of the occluded-feature point that is hidden due to occlusion. Further, the pseudo occluded-feature point estimation unit 12 estimates erroneously detected pseudo-feature point. Then, the comparison unit 13 calculates the correction quantity of the feature point, corrects the feature point, and compares the input image and the comparison image based on the normalized feature vectors. Further, the first exemplary embodiment corrects the feature point, which cannot be detected at the accurate positions due to occlusion, to more accurate positions, generates a normalized image of the input image, and compares the normalized image with the comparison image by using the facial feature vector of the normalized image. As such, the first exemplary embodiment can provide an effect of realizing highly precise authentication.

(Second Exemplary Embodiment)

A face comparison device 20 according to a second exemplary embodiment of the present invention will be described.

Figure 6:
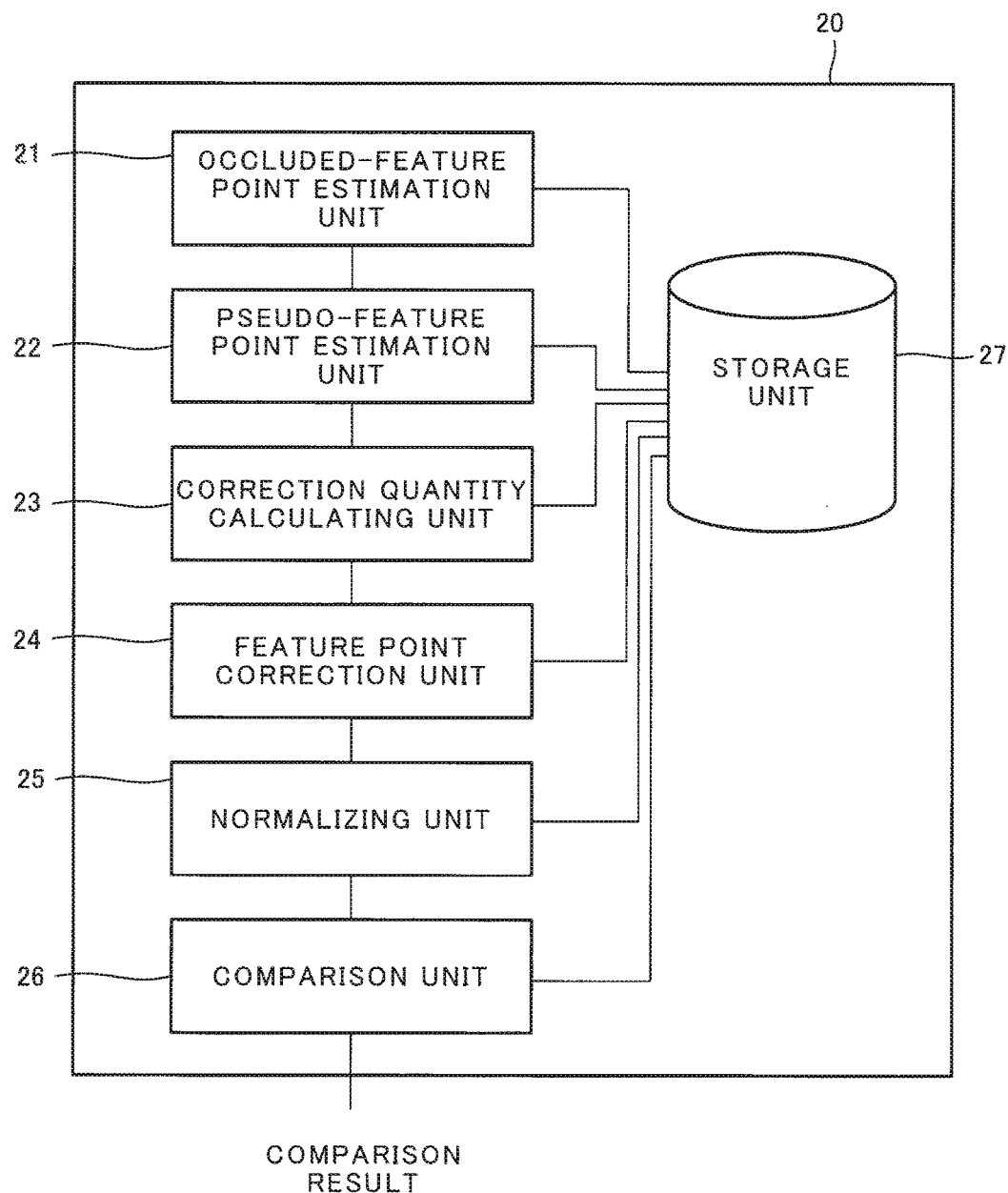
FIG. 6 is a block diagram illustrating an example of a configuration of the face comparison device according to the second exemplary embodiment.

FIG. 6 is a block diagram illustrating an example of a configuration of the face comparison device 20 according to the second exemplary embodiment.

As illustrated in FIG. 6, the comparison unit 26 of the face comparison device 20 according to the second exemplary embodiment has a comparing function, which is different from the comparison unit 13 of the face comparison device 10 according to the first exemplary embodiment. The second exemplary embodiment allocates the functions of the correction quantity calculation, feature point correction, and generation of a normalized image respectively to a correction quantity calculating unit 23, a feature point correction unit 24, and a normalizing unit 25. It should be noted that the contents of processing and the processing methods of the correction quantity calculating unit 23, feature point correction unit 24, and normalizing unit 25 are the same as the functions of the comparison unit 13 of the face comparison device 10 according to the first exemplary embodiment.

The face comparison device 20 of the second exemplary embodiment further includes a storage unit 27. The storage unit 27 stores, in advance, an input image, a model feature point arranged on a three-dimensional stereoscopic face model, and a facial feature vector of a comparison image or a normalized comparison image obtained by normalizing the comparison image. The configuration and processing of the second exemplary embodiment other than the above-mentioned configuration and processing are the same as the above first exemplary embodiment. For example, the occluded-feature point estimation unit 21 and pseudo-feature point estimation unit 22 are the same as the occluded-feature point estimation unit 11 and pseudo-feature point estimation unit 12 in the first exemplary embodiment.

FIG. 7 is a flowchart illustrating an example of the operation of the face comparison device according to the second exemplary embodiment.

As illustrated in FIG. 7, the occluded-feature point estimation unit 21 of the face comparison device 20 according to the second exemplary embodiment acquires the input image and the model feature point arranged on the three-dimensional stereoscopic face model from the storage unit 27. The other processing that the occluded-feature point estimation unit 21 and the pseudo-feature point estimation unit 22 perform is the same processing of the occluded-feature point estimation unit 11 and the pseudo-feature point estimation unit 12 of the face comparison device according to the first exemplary embodiment, of which detailed description is omitted here (steps S21 to S22).

Next, the correction quantity calculating unit 23 calculates a correction value for correcting the feature point of the face in the input image. The processing is the same as the correction value calculation processing of the comparison unit 13 of the face comparison device according to the first exemplary embodiment, of which detailed description is omitted here (step S23).

Subsequently, the feature point correction unit 24 receives the correction value from the correction quantity calculating unit 23, corrects the feature point of the face in the input image, and outputs the feature point of the face of the input image including the corrected feature point. The correction processing in the feature point correction unit 24 is the same as the correction processing of the comparison unit 13 of the face comparison device according to the first exemplary embodiment. Thus, the detailed description of the processing is omitted here (step S24).

Next, the normalizing unit 25 receives the feature point of the face in the input image including the corrected occluded-feature point, generates a normalized image by normalizing the input image, and outputs the generated normalized image. The normalization processing of the normalizing unit 25 is the same as the normalization processing of the comparison unit 13 of the face comparison device according to the first exemplary embodiment. Thus, the detailed description of the processing is omitted here (step S25).

Subsequently, the comparison unit 26 extracts a facial feature vector from the normalized image of the input image and compares the extracted facial feature vector and a facial feature vector of the normalized image of the comparison image that is generated by normalizing the comparison image. Then, the comparison unit 26 outputs the comparison result. The comparison processing of the comparison unit 26 is the same as the comparison processing of the comparison unit 13 of the face comparison device according to the first exemplary embodiment. Thus, the detailed description of the processing is omitted here (step S26).

With the end of the above processing, the face comparison device 20 according to the second exemplary embodiment ends the operation (processing).

The second exemplary embodiment further includes a storage unit 27. Further, the second exemplary embodiment allocates the functions of the correction quantity calculation, feature point correction, and generation of a normalized image in the comparison unit 13 according to the first exemplary embodiment respectively to a correction quantity calculating unit 23, a feature point correction unit 24, and a normalizing unit 25. Thus, when a plurality of images are processed, the correction quantity calculating unit 23, feature point correction unit 24, and normalizing unit 25 perform respective processing in parallel. In other words, the second exemplary embodiment can realize pipeline processing. In this way, the second exemplary embodiment can enhance the speed of processing when processing a plurality of images. It should be noted that the correction quantity calculating unit 23, feature point correction unit 24, and normalizing unit 25 may include a storage unit (e.g., buffer), not illustrated, to realize the above operation.

(Third Exemplary Embodiment)

A face comparison device 30 according to a third exemplary embodiment of the present invention will be described.

Figure 8:
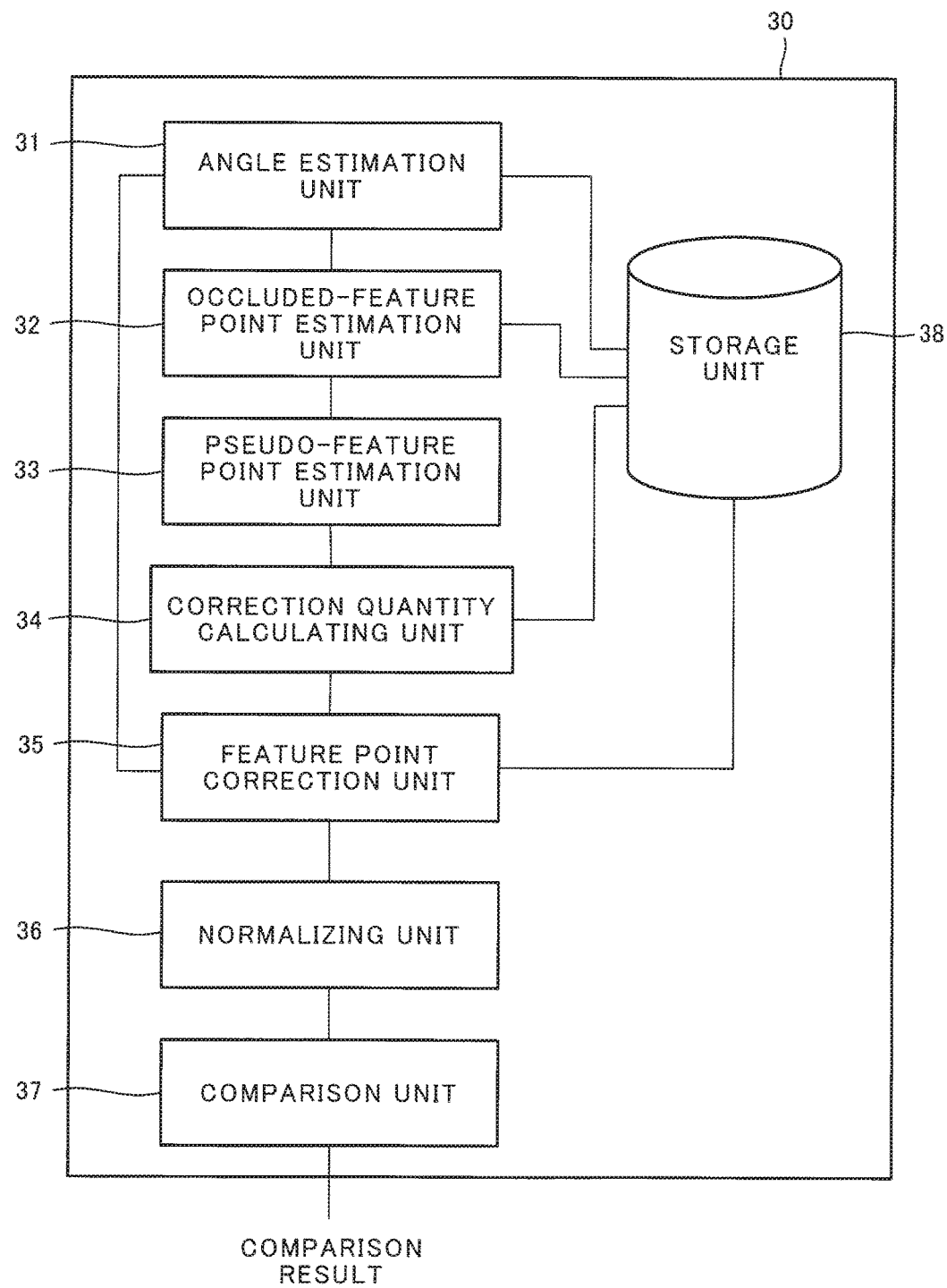
FIG. 8 is a block diagram illustrating an example of a configuration of a face comparison device according to a third exemplary embodiment.

FIG. 8 is a block diagram illustrating an example of a configuration of the face comparison device 30 according to the third exemplary embodiment.

As illustrated in FIG. 8, the face comparison device 30 according to the third exemplary embodiment further includes an angle estimation unit 31 in addition to the configuration of the second exemplary embodiment. The configuration other than the angle estimation unit 31, that is, the configuration of the occluded-feature point estimation unit 32, pseudo-feature point estimation unit 33, correction quantity calculating unit 34, feature point correction unit 35, normalizing unit 36, and comparison unit 37 and processing are the same as the configuration and processing of the second exemplary embodiment. The respective correspondences are as follows: The occluded-feature point estimation unit 32 is equivalent to the occluded-feature point estimation unit 21. The pseudo-feature point estimation unit 33 is equivalent to the pseudo-feature point estimation unit 22. The correction quantity calculating unit 34 is equivalent to the correction quantity calculating unit 23. The feature point correction unit 35 is equivalent to the feature point correction unit 24. The normalizing unit 36 is equivalent to the normalizing unit 25. The comparison unit 37 is equivalent to the comparison unit 26.

Figure 9:
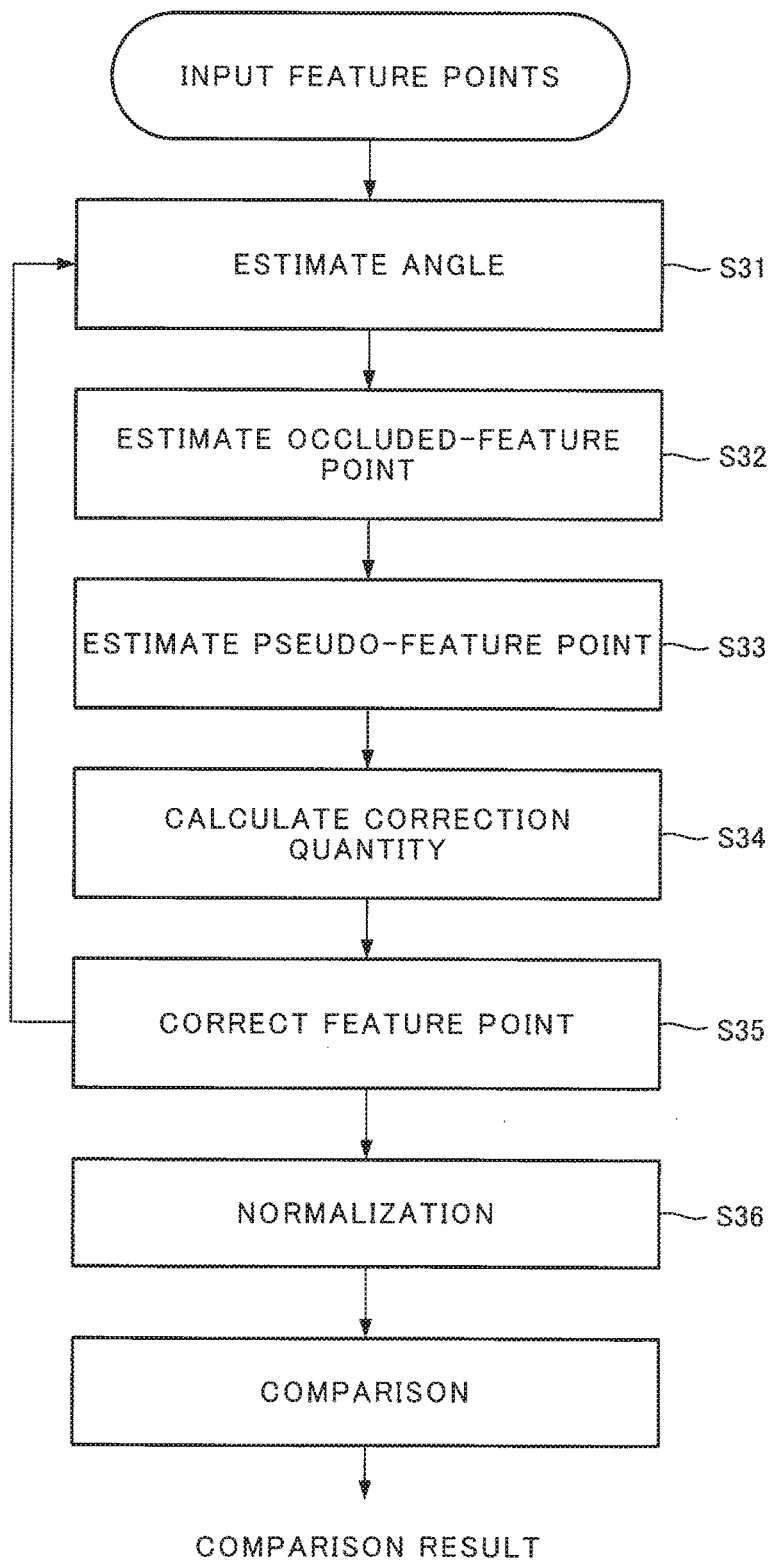
FIG. 9 is a flowchart illustrating an example of an operation of the face comparison device according to the third exemplary embodiment.

FIG. 9 is a flowchart illustrating an example of the operation of the face comparison device 30 according to the third exemplary embodiment.

The angle estimation unit 31 of the face comparison device 30 according to the third exemplary embodiment estimates an angle of a face in an input image by using the feature point of the face in the input image and the model feature point arranged on the three-dimensional stereoscopic face model. The angle estimation unit 31 may acquire the feature point of the face in the input image and the model feature point arranged on the three-dimensional stereoscopic face model from an external device which is not illustrated. Alternatively, the storage unit 38 of the third exemplary embodiment may store the information in advance.

For more concretely, the angle estimation unit 31 estimates a perspective projection transformation parameter between a feature point of the face in the input image "$P_i=(u,v)$" and a model feature point "$P_m=(X,Y,Z)$." It should be noted that, in the same way as the first exemplary embodiment, $P_i$ refers to a feature point of the face in a two-dimensional image. Further, u refers to a horizontal axis in the two-dimensional coordinate and v refers to a vertical axis in the two-dimensional coordinate. The angle estimation unit 31 decomposes (QR decomposition) a matrix that represents an estimated perspective projection transformation parameter to an orthogonal matrix Q and an upper triangular matrix R. The angle estimation unit 31 further decomposes the matrix obtained by QR decomposition (equivalent to the rotation matrix of parameters outside of the camera). The angle estimation unit 31 calculates a vertical rotation angle (pitch angle) of the face relating to an X axis and a horizontal rotation angle (yaw angle) of the face relating to a Y axis based on the above decomposition processing. Then, the angle estimation unit 31 estimates the angle information of the face in the input image based on the calculated angle.

The angle estimation unit 31 may estimate a perspective projection transformation parameter by using a nonlinear optimization method. Alternatively, the angle estimation unit 31 may estimate a perspective projection transformation parameter by using a linear least-squares method by assuming linear approximation.

The angle estimation unit 31 transmits the calculated angle information of the face in the input image to the occluded-feature point estimation unit 32 (step S31).

The following processing (steps S32 to S35) is the same processing as the processing of the second exemplary embodiment (steps S21 to S24), of which detailed description is omitted here.

Then, the angle estimation unit 31 acquires the feature point of the face including the corrected feature point from the feature point correction unit 35 and re-estimates the angle of the face in the input image based on the corrected feature point of the face and the model feature point arranged on the three-dimensional stereoscopic face model.

In the third exemplary embodiment, the processing of the above steps S32 to S35 is repeated. Then, in the third exemplary embodiment, the repeat processing ends when the correction value of the occluded-feature point from the feature point correction unit 35 becomes equal to or less than a certain value or the repeat count becomes equal to a predetermined count or more.

The angle estimation unit 31 estimates the angle information of the face in the input image based on the feature point of the face including the feature point eventually corrected by the feature point correction unit 35 and the model feature point arranged on the three-dimensional stereoscopic face model. Then, the angle estimation unit 31 outputs the angle information of the face in the estimated input image to the occluded-feature point estimation unit 32.

Thereafter, in the third exemplary embodiment, the same processing as the second exemplary embodiment is executed, and, after the execution, the processing ends.

In the third exemplary embodiment, the angle information of the face in the input image can be estimated by using the information of the feature point of the face in the input image without acquiring the angle information of the face in the input image in advance. This is because the angle estimation unit 31 estimates the angle information of the face in the input image.

(Fourth Exemplary Embodiment)

A face comparison device 40 according to a fourth exemplary embodiment of the present invention will be described.

Figure 10:
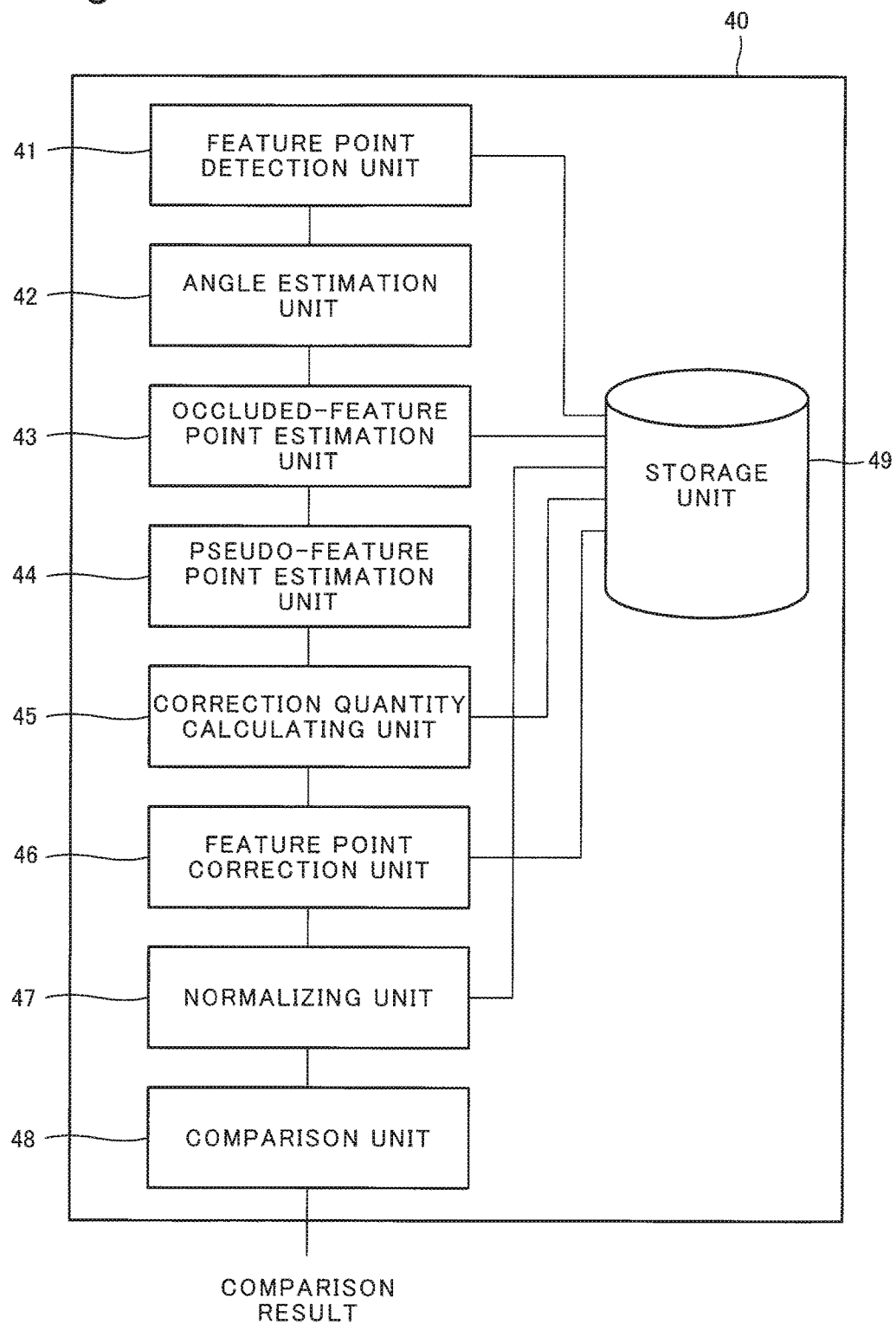
FIG. 10 is a block diagram illustrating an example of a configuration of a face comparison device according to a fourth exemplary embodiment.

FIG. 10 is a block diagram illustrating an example of a configuration of the face comparison device 40 according to the fourth exemplary embodiment.

As illustrated in FIG. 10, the face comparison device 40 according to the fourth exemplary embodiment further includes a feature point detection unit 41 in addition to the configuration of the third exemplary embodiment. The configuration other than the feature point detection unit 41, that is, the configuration of the angle estimation unit 42, occluded-feature point estimation unit 43, pseudo-feature point estimation unit 44, correction quantity calculating unit 45, feature point correction unit 46, normalizing unit 47, and comparison unit 48, and processing are the same as the configuration and processing of the third exemplary embodiment. The respective correspondences are as follows: The angle estimation unit 42 is equivalent to the angle estimation unit 31. The occluded-feature point estimation unit 43 is equivalent to the occluded-feature point estimation unit 32. The pseudo-feature point estimation unit 44 is equivalent to the pseudo-feature point estimation unit 33. The correction quantity calculating unit 45 is equivalent to the correction quantity calculating unit 34. The feature point correction unit 46 is equivalent to the feature point correction unit 35. The normalizing unit 47 is equivalent to the normalizing unit 36. The comparison unit 48 is equivalent to the comparison unit 37.

Figure 11:
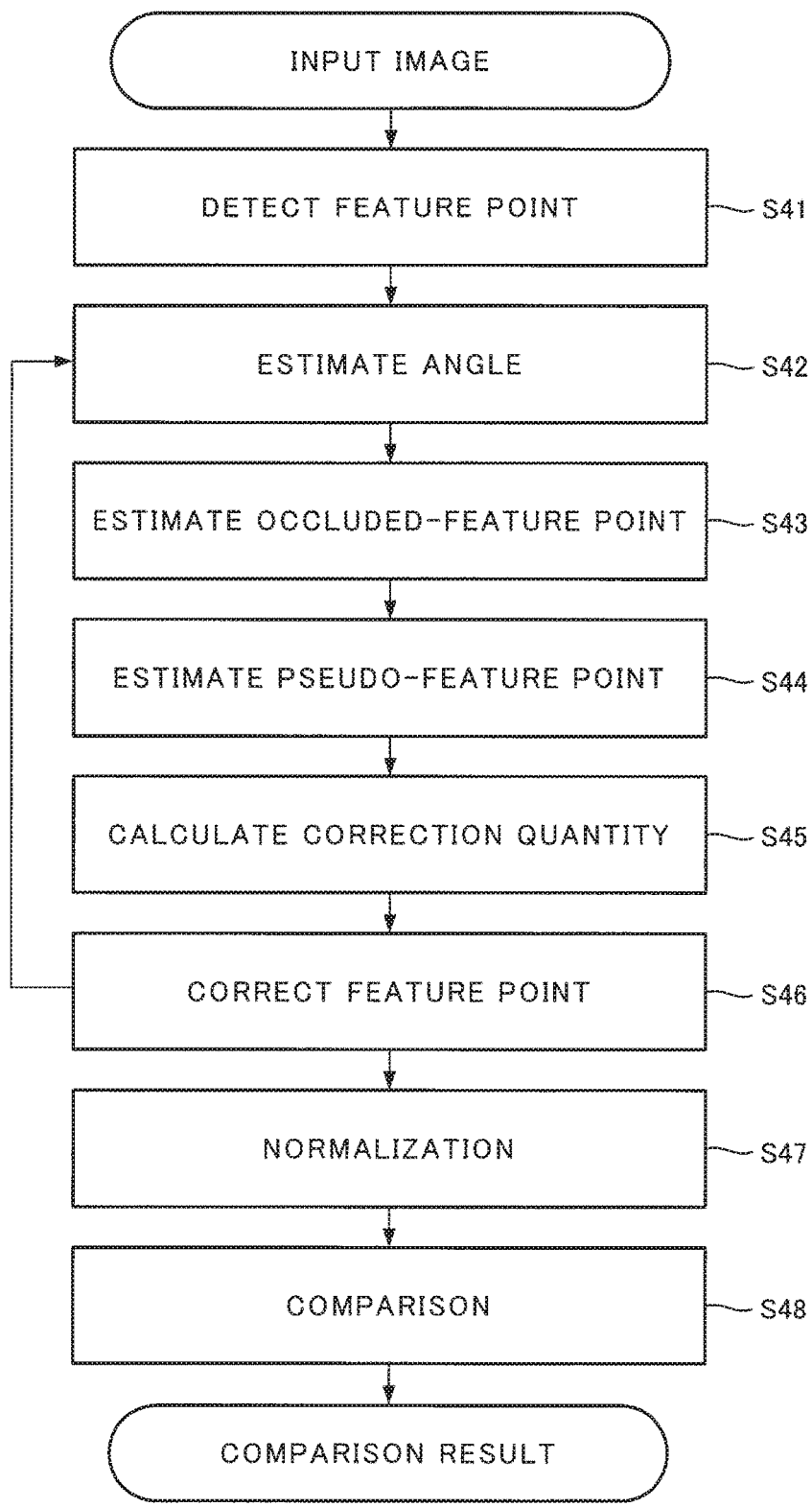
FIG. 11 is a flowchart illustrating an example of an operation of the face comparison device according to the fourth exemplary embodiment.

FIG. 11 is a flowchart illustrating an example of the operation of the face comparison device 40 according to the fourth exemplary embodiment.

In the fourth exemplary embodiment, as illustrated in FIG. 11, the feature point detection unit 41 detects a face existing in an input image and the feature point of the face existing within the face (step S41). It should be noted that, in the fourth exemplary embodiment, the input image may be acquired from an external device, which is not illustrated. Alternatively, in the fourth exemplary embodiment, the storage unit 49 may store the above information in advance.

The face comparison device 40 may set the model feature point in line with the feature point of the face to be detected in the input image. The method of detecting a face and the feature point of the face from the input image is arbitrary and a common algorithm may be used. For example, the face comparison device 40 may use a face detection algorithm that utilizes a Haar-Like feature that is commonly used for face detection and AdaBoost (Adaptive Boosting) that is a machine learning algorithm.

The feature point of the face detected by the feature point detection unit 41 is a feature point at the same position as the model feature point arranged on a three-dimensional stereoscopic face model stored in the storage unit 49.

It should be noted that the input image and the model feature point arranged on the three-dimensional stereoscopic face model may be stored in the storage unit 49 in advance. Alternatively, the information may be acquired from an external device, which is not illustrated.

The subsequent steps S42 to S47 are the same as the third exemplary embodiment. For further details, the processing of estimation of the angle of the face (step S42), estimation of an occluded-feature point (step S43), estimation of a pseudo-feature point (step S44), calculation of a correction quantity (step S45), correction of a feature point (step S46), and normalization (step S47) is the same as those of the third exemplary embodiment. The processing is the same processing as the processing of the third exemplary embodiment (steps S31 to S36). Thus, the detailed description of the processing is omitted here.

Next, the comparison unit 48 receives the generated and normalized two-dimensional face image from the normalizing unit 47 and extracts a facial feature vector of the normalized image. Then, the comparison unit 48 compares a facial feature vector of a comparison image, which is obtained by applying the same processing to the comparison image or is stored in advance in the storage unit 49, and the facial feature vector of the normalized image. Then, the comparison unit 48 outputs the comparison result (step S48).

With the end of the above processing, the face comparison device 40 according to the fourth exemplary embodiment ends the operation.

The fourth exemplary embodiment can provide an effect of detecting the feature point of a face in an input image by using the input image without acquiring the face existing in the input image and the feature point of the face existing within the face in advance. This is because the feature point detection unit 41 detects the feature point.

(Hardware Configuration)

Next, the hardware configuration of the face recognition device 10 to 40 according to the above-described exemplary embodiments will be described with reference to the drawings.

In each of the above-described exemplary embodiment, the processing that is described with reference to each flowchart can be realized by a computer.

When a computer is used, a program that describes processing contents of the functions of the face comparison device 10 to 40 is provided to the face recognition device 10 to 40.

Figure 12:
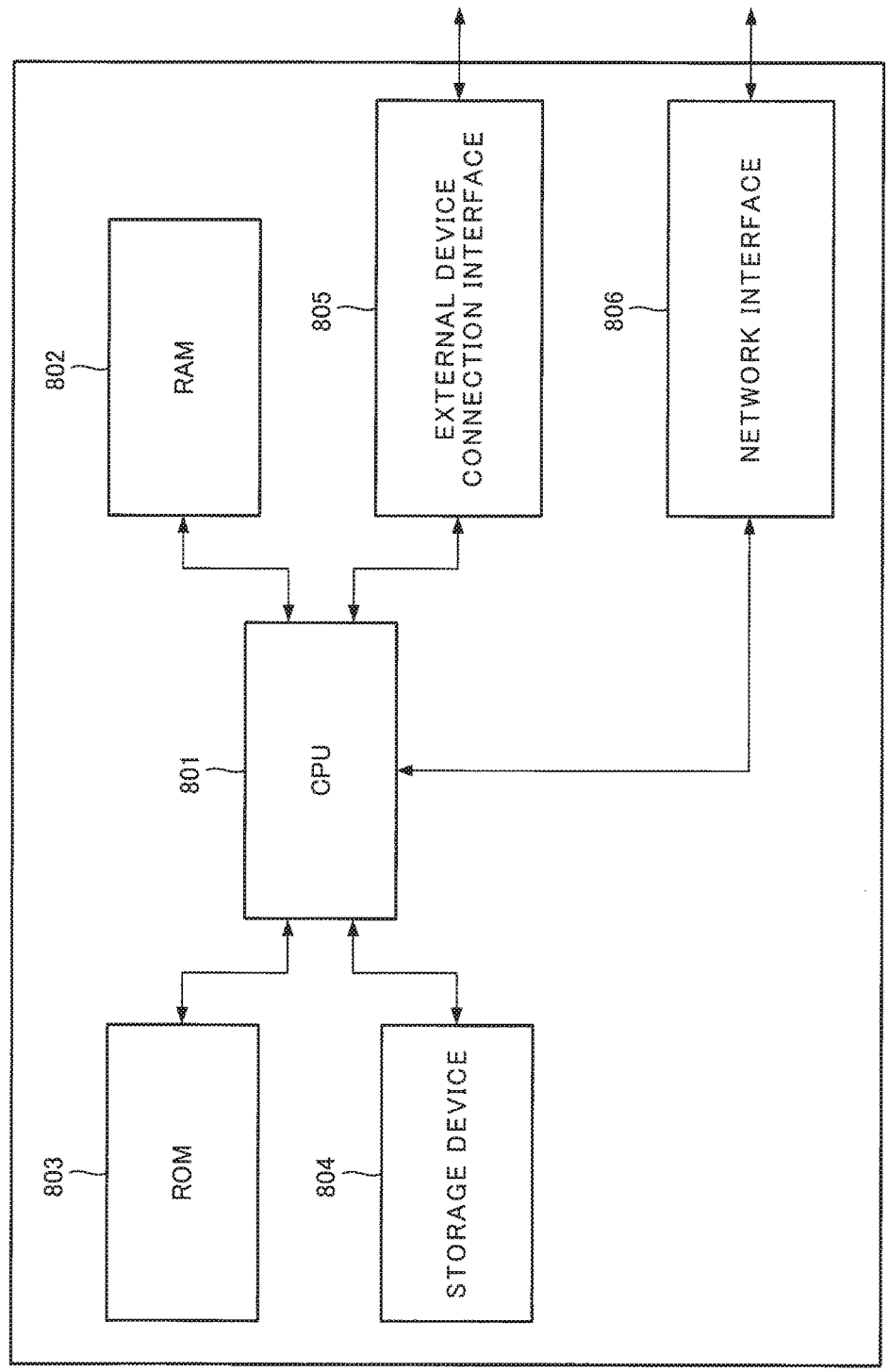
FIG. 12 is a block diagram illustrating an example of a hardware configuration of the face comparison device according to the first to fourth exemplary embodiments.
Figure 13:
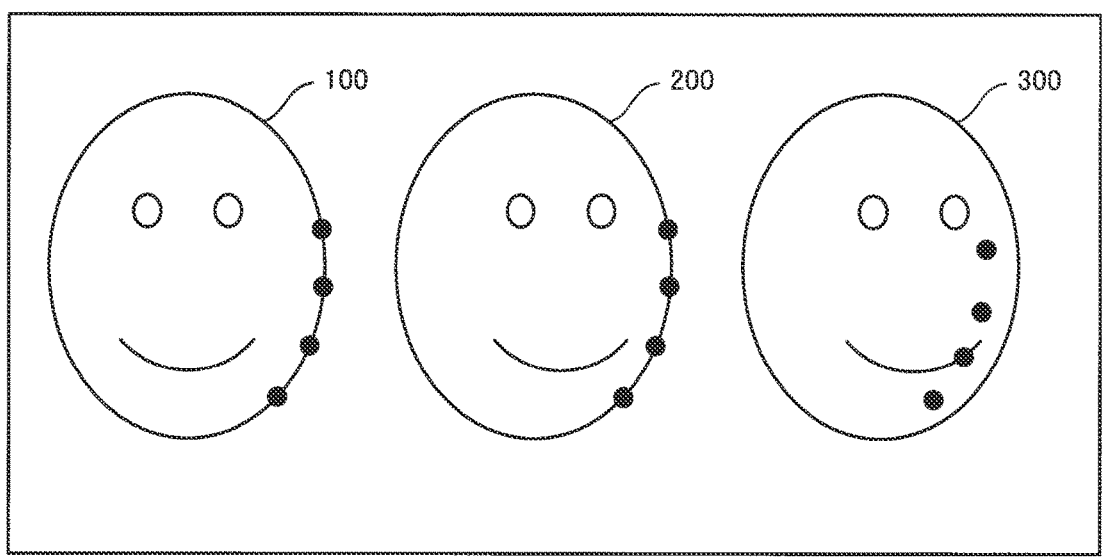
FIG. 13 is a diagram illustrating an example of erroneously detecting likely positions as feature points in an image when the feature points that are supposed to exist are hidden due to occlusion, by taking an example of face contour points.

FIG. 12 is a block diagram illustrating an example of a hardware configuration of the face comparison device 10 to 40 according to the first to fourth exemplary embodiments of the present invention.

As illustrated in FIG. 12, the face comparison device 10 to 40 realizes the functions in the above description as a computer including a CPU (Central Processing Unit) 801. Accordingly, the CPU 801 loads a computer program stored in the ROM (Read Only Memory) 803 or the storage device 804 (Hard Disk Drive (HDD)) onto a RAM (Random Access Memory) 802, and executes the program. Then, in such an operation, the computer illustrated in FIG. 12 receives data through the external device connection interface 805 or the network interface 806 and processes the data.

Further, the program that describes the above processing contents may be stored in a computer-readable non-transitory recording medium. The computer-readable recording medium is, for example, a magnetic recording device, an optical disc, a magneto-optical recording medium, or a semiconductor memory.

When the above program is distributed, for example, a portable recording medium, such as DVD or CD-ROM, which records the program is sold. Further, the distribution of the program may be realized by storing the program in a server computer and transferring the program from the server computer to other computers via a network.

The computer that executes the above program, for example, stores the program, which is recorded in a portable recording medium or transferred from the server computer, in the storage device of its own.

Then, the computer reads the program from the storage device of its own and executes the processing according to the program. The computer may directly read the program from the portable recording medium and execute the processing according to the program.

Further, the computer may execute the processing according to the received program each time when the program is transferred from the server computer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-067598, filed on Mar. 28, 2014, the disclosure of which is incorporated herein in its entirety by reference.

The whole or part of the exemplary embodiments disclosed above can be described as, but not limited to, the following supplementary notes.

(Supplementary note 1)
A face comparison device includes:
an occluded-feature point estimation unit that estimates an occluded-feature point that is a feature point of an invisible face in an input image based on an angle of the face in the input image, a three-dimensional stereoscopic face model, and a model feature point arranged on the three-dimensional stereoscopic model, and outputs position information of the occluded-feature point;
a pseudo-feature point estimation unit that estimates a pseudo-feature point that is an erroneously detected feature point that is a feature point of the face not captured within the input image due to occlusion based on the angle of the face in the input image by using position information of the three-dimensional stereoscopic face model that is rotated, and outputs position information of the pseudo-feature point; and
a comparison unit that generates a normalized image of the input image by using the position information of the occluded-feature point and the position information of the pseudo-feature point, extracts a first facial feature vector from the generated normalized image of the input image, generates a normalized image of an acquired comparison image, extracts a second facial feature vector from the generated normalized image of the comparison image, and compares the first facial feature vector and the second facial feature vector.

(Supplementary Note 2)
The face comparison device according to supplementary note 1,
wherein the second facial feature vector is acquired instead of the acquisition of the comparison image.

(Supplementary note 3)
The face comparison device according to supplementary note 1 or 2,
wherein, when the occluded-feature point estimation unit rotates the three-dimensional stereoscopic face model and the model feature point arranged on the three-dimensional stereoscopic face model by using a same angle as the angle information of the face in the input image, and a line of sight that passes through the rotated model feature point intersects with the rotated three-dimensional stereoscopic face model at a position closer to an imaging device than the rotated model feature point, the occluded-feature point estimation unit estimates the intersection point as an occluded-feature point.

(Supplementary note 4)
The face comparison device according to any one of supplementary notes 1 to 3,
wherein, when the three-dimensional stereoscopic face model is orthographically projected, and a straight line that is parallel to a Z direction as a depth direction and passes through the model feature point that is rotated by the same angle as the angle information of the face in the input image intersects with the rotated three-dimensional stereoscopic face model at a position closer to an imaging device than the rotated model feature point, the occluded-feature point estimation unit estimates the intersection point as an occluded-feature point.

(Supplementary note 5)
The face comparison device according to any one of supplementary notes 1 to 4,
wherein the comparison unit corrects the position information of the feature point of the face in the input image by using, as a correction quantity, a quantity obtained by multiplying a difference between the position information of the occluded-feature point and the pseudo-feature point by a value of a difference between scales of the face in the input image and the rotated three-dimensional stereoscopic face model.

(Supplementary note 6)
The face comparison device according to any one of supplementary notes 1 to 5,
wherein the comparison unit uses, as a correction quantity, at least a quantity obtained by multiplying a difference between coordinate values of the occluded-feature point and the pseudo-feature point in an X direction as a horizontal direction by a value of a difference of scales between the face in the input image and the rotated three-dimensional stereoscopic face model as a scale factor.

(Supplementary note 7)
The face comparison device according to any one of supplementary notes 1 to 6, further includes:
a storage
unit that stores, in advance, the input image, the three-dimensional stereoscopic face model, the model feature point arranged on the three-dimensional stereoscopic face model, and the facial feature vector of the comparison image or the normalized image of the comparison image.

(Supplementary note 8)
The face comparison device according to any one of supplementary notes 1 to 6, further includes:
an angle estimation unit that calculates an angle of the face in the input image based on the feature point of the face in the input image.

(Supplementary Note 9)
A face comparison method includes:
estimating an occluded-feature point that is a feature point of an invisible face in an input image based on an angle of the face in the input image, a three-dimensional stereoscopic face model, and a model feature point arranged on the three-dimensional stereoscopic face model, and outputting position information of the occluded-feature point;

estimating a pseudo-feature point that is an erroneously detected feature point that is a feature point of the face not captured within the input image due to occlusion based on the angle of the face in the input image by using position information of the three-dimensional stereoscopic face model that is rotated, and outputting position information of the pseudo-feature point; and generating a normalized image of the input image by using the position information of the occluded-feature point and the position information of the pseudo-feature point, extracting a first facial feature vector from the generated normalized image of the input image, generating a normalized image of an acquired comparison image, extracting a second facial feature vector from the generated normalized image of the comparison image, and comparing the first facial feature vector and the second facial feature vector.

(Supplementary note 10)

A program causing a computer to perform a method, the method comprising:

estimating an occluded-feature point that is a feature point of an invisible face in an input image based on an angle of the face in the input image, a three-dimensional stereoscopic face model, and a model feature point arranged on the three-dimensional stereoscopic face model, and outputting position information of the occluded-feature point;

estimating a pseudo-feature point that is an erroneously detected feature point that is a feature point of the face not captured within the input image due to occlusion based on the angle of the face in the input image by using position information of the three-dimensional stereoscopic face model that is rotated, and outputting position information of the pseudo-feature point; and generating a normalized image of the input image by using the position information of the occluded-feature point and the position information of the pseudo-feature point, extracting a first facial feature vector from the generated normalized image of the input image, generating a normalized image of an acquired comparison image, extracting a second facial feature vector from the generated normalized image of the comparison image, and comparing the first facial feature vector and the second facial feature vector.

(Supplementary note 11)

A computer readable non-transitory recording medium embodying a program, the program causing a computer to perform a method, the method includes:

estimating an occluded-feature point that is a feature point of an invisible face in an input image based on an angle of the face in the input image, a three-dimensional stereoscopic face model, and a model feature point arranged on the three-dimensional stereoscopic face model, and outputting position information of the occluded-feature point;

estimating a pseudo-feature point that is an erroneously detected feature point that is a feature point of the face not captured within the input image due to occlusion based on the angle of the face in the input image by using position information of the three-dimensional stereoscopic face model that is rotated, and outputting position information of the pseudo-feature point; and generating a normalized image of the input image by using the position information of the occluded-feature point and the position information of the pseudo-feature point, extracting a first facial feature vector from the generated normalized image of the input image, generating a normalized image of an acquired comparison image, extracting a second facial feature vector from the generated normalized image of the comparison image, and comparing the first facial feature vector and the second facial feature vector.

INDUSTRIAL APPLICABILITY

The face comparison device of the present invention is applicable to, for example, a personal authentication system or an electronic device, such as a terminal, equipped with a face authentication technique.

REFERENCE SINGS LIST

10, 20, 30, 40 Face comparison device
11, 21, 32, 43 Occluded-feature point estimation unit
12, 22, 33, 44 Pseudo-feature point estimation unit
13, 26, 37, 48 Comparison unit
23, 34, 45 Correction quantity calculating unit
24, 35, 46 Feature point correction unit
25, 36, 47 Normalizing unit
27, 38, 49 Storage unit
31, 42 Angle estimation unit
41 Feature point detection unit
100 Face image
200 Face image
300 Face image
801 CPU
802 RAM
803 ROM
804 Storage device
805 External device connection interface
806 Network interface

What is claimed is:

1. A face comparison device comprising:
an occluded-feature point estimation unit that estimates an occluded-feature point that is a feature point of an invisible face in an input image based on an angle of the face in the input image, a three-dimensional stereoscopic face model, and a model feature point arranged on the three-dimensional stereoscopic model, and outputs position information of the occluded-feature point;
a pseudo-feature point estimation unit that estimates a pseudo-feature point that is an erroneously detected feature point that is a feature point of the face not captured within the input image due to occlusion based on the angle of the face in the input image by using position information of the three-dimensional stereoscopic face model that is rotated, and outputs position information of the pseudo-feature point; and
a comparison unit that generates a normalized image of the input image by using the position information of the occluded-feature point and the position information of the pseudo-feature point, extracts a first facial feature vector from the generated normalized image of the input image, generates a normalized image of an acquired comparison image, extracts a second facial feature vector from the generated normalized image of the comparison image, and compares the first facial feature vector and the second facial feature vector.

2. The face comparison device according to claim 1, wherein, when the occluded-feature point estimation unit rotates the three-dimensional stereoscopic face model and the model feature point arranged on the three-dimensional stereoscopic face model by using a same angle as the angle information of the face in the input image, and a line of sight that passes through the rotated model feature point intersects with the rotated three-dimensional stereoscopic face model at a position closer to an imaging device than the rotated model feature point, the occluded-feature point estimation unit estimates the intersection point as an occluded-feature point.

3. The face comparison device according to claim 1, wherein, when the three-dimensional stereoscopic face model is orthographically projected, and a straight line that is parallel to a Z direction as a depth direction and passes through the model feature point that is rotated by the same angle as the angle information of the face in the input image intersects with the rotated three-dimensional stereoscopic face model at a position closer to an imaging device than the rotated model feature point, the occluded-feature point estimation unit estimates the intersection point as an occluded-feature point.

4. The face comparison device according to claim 1, wherein the comparison unit corrects the position information of the feature point of the face in the input image by using, as a correction quantity, a quantity obtained by multiplying a difference between the position information of the occluded-feature point and the pseudo-feature point by a value of a difference between scales of the face in the input image and the rotated three-dimensional stereoscopic face model.

5. The face comparison device according to claim 1, wherein the comparison unit uses, as a correction quantity, at least a quantity obtained by multiplying a difference between coordinate values of the occluded-feature point and the pseudo-feature point in an X direction as a horizontal direction by a value of a difference of scales between the face in the input image and the rotated three-dimensional stereoscopic face model as a scale factor.

6. The face comparison device according to claim 1, further comprising:
a storage unit
that stores, in advance, the input image, the three-dimensional stereoscopic face model, the model feature point arranged on the three-dimensional stereoscopic face model, and the facial feature vector of the comparison image or the normalized image of the comparison image.

7. The face comparison device according to claim 1, further comprising:
an angle estimation unit that calculates an angle of the face in the input image based on the feature point of the face in the input image.

8. A face comparison method comprising:
estimating an occluded-feature point that is a feature point of an invisible face in an input image based on an angle of the face in the input image, a three-dimensional stereoscopic face model, and a model feature point arranged on the three-dimensional stereoscopic face model, and outputting position information of the occluded-feature point;
estimating a pseudo-feature point that is an erroneously detected feature point that is a feature point of the face not captured within the input image due to occlusion based on the angle of the face in the input image by using position information of the three-dimensional stereoscopic face model that is rotated, and outputting position information of the pseudo-feature point; and
generating a normalized image of the input image by using the position information of the occluded-feature point and the position information of the pseudo-feature point, extracting a first facial feature vector from the generated normalized image of the input image, generating a normalized image of an acquired comparison image, extracting a second facial feature vector from the generated normalized image of the comparison image, and comparing the first facial feature vector and the second facial feature vector.

9. A computer readable non-transitory recording medium embodying a program, the program causing a computer to perform a method, the method comprising:
estimating an occluded-feature point that is a feature point of an invisible face in an input image based on an angle of the face in the input image, a three-dimensional stereoscopic face model, and a model feature point arranged on the three-dimensional stereoscopic face model, and outputting position information of the occluded-feature point;
estimating a pseudo-feature point that is an erroneously detected feature point that is a feature point of the face not captured within the input image due to occlusion based on the angle of the face in the input image by using position information of the three-dimensional stereoscopic face model that is rotated, and outputting position information of the pseudo-feature point; and
generating a normalized image of the input image by using the position information of the occluded-feature point and the position information of the pseudo-feature point, extracting a first facial feature vector from the generated normalized image of the input image, generating a normalized image of an acquired comparison image, extracting a second facial feature vector from the generated normalized image of the comparison image, and comparing the first facial feature vector and the second facial feature vector.

* * * * *